(12) United States Patent
Fouquay et al.

(10) Patent No.: US 7,771,827 B2
(45) Date of Patent: Aug. 10, 2010

(54) COMPOSITION FOR THE COLD PREPARATION OF COMPOSITE MATERIALS FOR ADHESIVE BONDING

(75) Inventors: Stephane Fouquay, Mont Saint Aignan (FR); Jean-Pierre Lallier, Saint Bonnet de Mure (FR); Michel Miskovic, Comiegne (FR)

(73) Assignee: Arkema France, Colombes (FR)

( * ) Notice: Subject to any disclaimer, the term of this patent is extended or adjusted under 35 U.S.C. 154(b) by 1117 days.

(21) Appl. No.: 11/406,299

(22) Filed: Apr. 19, 2006

(65) Prior Publication Data
US 2006/0249048 A1    Nov. 9, 2006

Related U.S. Application Data

(63) Continuation-in-part of application No. 09/938,539, filed on Aug. 27, 2001, now abandoned.

(51) Int. Cl.
*B32D 7/12* (2006.01)
*C09J 189/00* (2006.01)

(52) U.S. Cl. .................. 428/423.7; 106/156.4
(58) Field of Classification Search ............. 106/156.4; 524/744, 745, 113; 428/423.1, 423.7
See application file for complete search history.

(56) References Cited

U.S. PATENT DOCUMENTS

| 4,397,707 | A | 8/1983 | Dawdy |
| 5,326,881 | A | 7/1994 | Hirano et al. |
| 5,599,954 | A | 2/1997 | Mitsuhashi et al. |
| 5,792,303 | A | 8/1998 | Liu |
| 6,001,192 | A | 12/1999 | Lallier et al. |

OTHER PUBLICATIONS

International Search Report issued in French Patent Application No. 0010110, dated Apr. 10, 2001.

*Primary Examiner*—Thao T. Tran
(74) *Attorney, Agent, or Firm*—Hunton & Williams LLP

(57) ABSTRACT

The present invention relates to a liquid composition for the cold preparation of laminate composite materials so as to confer to them, without preliminary sanding or abrasion, a surface state favorable to adhesive bonding with polyurethane type adhesives comprising
  (a) at least one polar aprotic solvent (TPA);
  (b) at least one ether (TE) selected from ethers, etheresters, and ether-ketones having: a molar volume less than 200 $cm^3$/mole and preferably less than 160 $cm^3$/mole, a molecule devoid of a hydroxyl function, and
  (c) at least one activator (TA) comprising at least one reactive nitrogenous function of the —$NH_2$ and/or —NH— type of molar volume less than 100 $cm^3$/mole.

22 Claims, No Drawings

COMPOSITION FOR THE COLD PREPARATION OF COMPOSITE MATERIALS FOR ADHESIVE BONDING

CROSS REFERENCE TO RELATED APPLICATIONS

This application is a continuation-in-part of application Ser. No. 09/938,539, filed Aug. 27, 2001, which is incorporated herein by reference.

BACKGROUND OF THE INVENTION (i) Field of the Invention

The present invention relates to a liquid composition useful in the cold preparation of composite materials to confer to them without preliminary sanding or abrasion a surface state favorable for adhesive bonding with the aid of polyurethane type adhesives.

(ii) Description of the Related Art

Composite materials principally comprise two components: an unsaturated polyester-type resin and at least one reinforcing filler comprised of glass fibers.

These composite materials are most often found as either mass composites or laminated composites.

The mass composite materials principally comprise three components: 1) an unsaturated polyester resin (UP) (about 30% by weight), 2) a reinforcing filler generally comprised of glass fibers (about 20% by weight), and 3) an inert packing filler (about 50% by weight) often comprised of calcium carbonate, which is intended to reduce the cost of the material. Naturally, other additives can be added. For example, thermoplastic additives such as polyvinyl acetate (PVAc) can be added, which can both limit the shrinkage of the resin during the polymerization and promote smooth surfaces. Internal mold-release agents such as zinc or calcium stearates can also be added to facilitate the release of the composite materials from a mold.

When these composite materials are molded when cold and/or under a vacuum, they are called contact polyesters. When molded by heat, they are referred to by a series of abbreviations such as SMC (Sheet Molding Compound), BMC (Bulk Molding Compound), RTM (Resin Transfer Molding), AMC (Adapted Molding Compound), and RIM (Resin Injection Molding), etc.

The automobile industry is representative of the users of this type of composite material. This industry has been increasingly using these materials to replace sheet metal, thereby reducing weight, resolving corrosion problems, and enabling new forms. The joining of such materials by adhesive bonding is the only means of available for assembly because classic techniques such as fastening and bolting are not suitable. Moreover, after painting, the finished surface must present a smooth appearance identical to that of the sheet metal that also may be present on the vehicle.

The terms GRP (Glass Reinforced Plastics) or FRP (Fiber Reinforced Polymers) designate any laminated composite material or composite piece including an unsaturated polyester type resin matrix and reinforcement fibers, including glass fibers. In the manufacture of a GRP piece, lamination begins after a "gel coating" is applied and is in its hardening phase. Lamination is achieved by creating a series of successive reinforcing resin layers on the gel coat that after debulking results in a hard and compact structural assembly of the pieces.

The reinforcement material may comprise a glass mat, cut glass threads or glass tissues, or other materials that impart optimal structural properties in the molded object. Fibers based on synthetic polymers (in roving, mat, or non-woven cloth form), inorganic materials or compounds such as boron, carbon (graphite) or silica (in roving or mat form) are also suitable. Glass fiber reinforcements such as the following are frequently used and are known to those of skill in the art:

glass mat or web
cut fiber mat
Roving or Stratifil,
Roving tissue
fabric or tissue
sandwich materials For a lamination resin, the choice of reinforcement is made according the mechanical characteristics desired, including the number of layers, the thickness of the laminate, and its amount of glass.

The resin can be manually applied, by brush, by spraying, or by injection. The technique chosen varies according to the form, size, and number of pieces to be produced.

Polyester resins are widely used and yield excellent results for contact molding. For applications requiring specific mechanical properties, vinyl-ester resins and epoxy resins are also used. Whatever type of resin is used, the cold transformation is an irreversible change for the molded resin from a liquid state to a solid state, during which, by chemical reaction, the material acquires its final characteristics. This transformation is therefore an important stage which not only governs the behavior and the properties of the molded piece but also its surface state.

The leisure boating industry is representative of the users of the contact molding technique. This open mold lamination process is carried out manually or by simultaneous spraying of the glass and of the resin, which is called low pressure lamination. The leisure boating industry frequently uses unsaturated polyester-resin-based laminates to make boat hulls, which incorporate, before the fitting of the deck, a number of bulkheads that are positioned according to the desired boat model. In such an application, the use of adhesive bonding is the only available means of assembly because classical techniques such as fastening and bolting are not suitable.

A polyurethane is generally used and may comprise the mono-component (PU1K or HMPUR) or bi-component (PU2K) type.

The quality of the adhesive bond between two pieces, where at least one of the pieces is made of a composite material, is thus a necessary concern when minimizing the costs of preparation of the surfaces to bond.

The quality of the adhesive bond is determined by tensile and shearing strength rupture resistance tests according to the "hold method" which defines breaking patterns. It is necessary to distinguish the adhesive rupture (AR), considered to be bad, when the adhesive remains integral with a support, the cohesive rupture (CR) considered to be good, where the rupture takes place in the middle of the adhesive layer, and the support rupture (SR), considered to be excellent, where the support ruptures independent of the adhesive, known as "support delamination" (DEL). CR and SR involve "structural or semi-structural" type rupture. A series of intermediate cases typically exist which are assessed by percentage of the affected surfaces.

In the case of a laminated composite, the laminate represents the largest part of any GRP piece, and is therefore what confers the mechanical resistance to the molded piece. This requires the elimination of the zones that are poor or rich in resins by a uniform distribution of the resin and the reinforcement and a rigorous control of the resin/glass ratio. Finally, the number of air cavities or of small surface craters is eliminated with a careful "debulking" which gives a vitrified appearance to the piece. The very closed polyester structure has an influence on the surface characteristics of the composite and consequently on its adhesive behavior.

A solvent such as methyl ethyl ketone, dichloromethane, and/or acetone is typically used to treat the surfaces of the pieces to be adhesively bonded. These solvents act as degreasing agents for the partial solubilization and/or the crude elimination of the internal mold release agents and of the thermoplastic phase present at the surface. This treatment is not however sufficiently effective to avoid a preliminary sanding or abrasion of the pieces to be bonded before the "degreasing," and this mechanical sanding or abrasion operation is a source of unwanted dust. The sanding or abrasion is also made more difficult by complex geometries of the pieces to be bonded.

Chemical treatments of the substrate adapted to the adhesives used are also proposed.

U.S. Pat. No. 5,792,203 describes the use of amine based compositions in a non-volatile fluid solvent in order to promote the adhesive bonding of plastics by means of cyanoacrylate-based adhesive compositions.

U.S. Pat. No. 4,397,707 describes an adhesive bonding process of polyester-based materials by means of a reactive isocyanate/aminoresin coating (urea formaldehyde or melamine formaldehyde).

SUMMARY AND OBJECTS OF THE INVENTION

The applicant has thus found in a surprising fashion, that the cold use of a liquid composition according to the present invention permitted the avoidance of sanding or abrasion operations, as well as drying before application of the polyurethane-type adhesive.

Thus, the object of the present invention is a composition for the cold preparation of composite materials based on polyester resins to improve the surface state of the composite materials for adhesive bonding by means of polyurethane type adhesives comprising:
 a) at least one polar aprotic solvent (TPA)
 b) at least one ether (TE) chosen from ethers, ether-esters, and ether-ketones having:
  a molar volume less than 200 cm$^3$/mole and preferably less than 160 cm$^3$/mole,
  a molecule devoid of a hydroxyl function, and
 c) at least one activator (TA) comprising at least one reactive nitrogenous function of the type —NH$_2$ and/or —NH— of molar volume less than 100 cm$^3$/mole.

DETAILED DESCRIPTION OF THE PREFERRED EMBODIMENTS:

The composition according to the invention comprises a polar aprotic solvent (TPA) or a mixture of these solvents which are chosen from the group consisting of dimethylsulfoxide (DMSO), dimethylformamide (DMF), 1-methyl-2-pyrrolidinone (NMP), N-methylmorpholine (NMm), γ-butyrolactone (Blo), acetonitrile (AcN), ethylene carbonate, and propylene carbonate.

The composition according to the invention comprises an ether or a mixture of ethers (TE) of which the molar volume is less than 200 cm$^3$/mole and preferably less than 160 cm$^3$/mole. Molar volume in the present application is the molecular mass/density ratio.

TE comprises the ethers: 1,4-dioxane (Dx), methyl-tert-butyl-ether (MTBE), diethylether, tert-amyl-methylether (TAME), 2-methoxy-1,3-dioxolane, 1,3,5-trioxane, methyl methoxyacetate, methyl-3-methoxy-propionate (MMP), dipropyleneglycol dimethylether (DPGDME), propyleneglycol methyl ether acetate (PGMA), tetrahydrofuran (THF), benzyl oxide (BO), dibenzyl ether (DBE), 1,3-dimethoxybenzene, 1,4-dimethoxybenzene, 1,2,3-trimethoxybenzene, 2-methoxy-1,3-dioxolane, 1,3-dioxolane, anisole, 1,2-dimethoxybenzene, 2-methoxy-3,4-dihydropyrane, 2,5-dimethoxytetrahydrofuran, ethyleneglycoldimethylether, 1-tert-butoxy-2-methoxyethane, 1,4-dioxane, 1,3-dioxane and their mixtures.

According to one embodiment of the present invention, the ethers have flash points greater than 0° C. The high flash point of the benzyl oxide (BO) or dibenzyl ether (greater than 100° C.) notably permits the use of temperatures greater than 40° C.

The composition according to the invention comprises an activator or a mixture of activators (TA) comprising one or several reactive nitrogenous functions of the type —NH$_2$ and/or —NH— chosen in the family of the primary and/or secondary amines of molar volume less than 100 cm$^3$/mole. TA may comprise: pyrrole (PY), imidazole (IM), 3-pyrroline, pyrazole, 3-pyrroline, and their mixtures.

A ternary composition, Total Polar Aprotic (TPA)/Total Ether (TE)/Total Activator (TA), is represented on the ternary diagram by the coordinates:

TPA*=[TPA/(TPA+TE+TA)]·10$^2$

TE*=[TE/(TPA+TE+TA)]·10$^2$

TA*=[TA/(TPA+TE+TA)]·10$^2$ where the looping relation is applied at 100% of the composition TPA*+TE*+TA*=100, all the amounts TPA, TE, TA are expressed by volume, and the amounts TPA*, TE* and TA* appear as volume percentages.

The compositions of the invention obey the relationships:

10%≦TPA*≦40%

55%≦TE*≦85%

1%≦TA*≦25%

According to a preferred embodiment of the present invention, the solvent or mixture of polar aprotic solvents (TPA), the ether or mixture of ethers (TE) and the activator or mixture of activators (TA) are present in the composition in quantities respectively ranging from 20% to 30%, 65% to 75%, and 2% to 10% by volume.

According to one embodiment of the invention, the polar aprotic fraction (TPA) is a mixture of dimethylsulfoxide (DMSO) and of dimethylformamide (DMF). According to this embodiment, the ratio of volume of DMSO to the volume of DMF is advantageously about 40/60, and is preferably about 50/50.

Another object of the present invention is a process for the cold surface preparation of supports of laminated composite materials for their adhesive bonding comprising treating the surface of the supports with a composition according to the present invention before application of a polyurethane type adhesive.

The preparation of the compositions according to the invention can be done by simple mixing of the different constituents, with the help of an agitator or any other appropriate device.

The process for the preparation of the surface is implemented by depositing the composition according to the present invention on the part of the surface of the object which is to receive the adhesive. The deposit of the composition according to the invention can be made by any means, including but not limited to immersion, spraying, atomization, and coating with a brush, a rag, or a sponge, etc. The deposit is carried out at a temperature ranging from about 5° C. to about 50° C. and is advantageously carried out at an ambient temperature generally ranging from about 15° C. to about 30° C. The contact time before application of the adhesive ranges preferably ranges from 1 to 60 minutes.

The present invention will now be described by the following examples, which are provided for illustration, but which should not be considered as limiting the present invention, for which numerous variations are easily accessible to a person skilled in the art.

EXAMPLES

In the examples, the breaking pattern of the support by pulling/tearing is characterized starting from a combination of two polyester test pieces charged with glass fiber and with GRP of an unsaturated polyester resin base. The method comprises cold application (23° C.) of a strand (10 cm×0.8 cm; 1 mm thickness) of the bi-constituent polyurethane type adhesive to one of the two test pieces before bringing it into contact with the second test piece, previously put into contact with a composition according to the invention for at least 1 minute at ambient temperature (23° C.). The assembly of the two test pieces is then allowed to lie in an enclosure at 150° C. for 150 seconds. After returning to ambient temperature (23° C.), the assembly is subjected to pulling/tearing stresses until separation of the two test pieces.

The efficacy of the adhesive-support bond is then evaluated by the type of rupture: adhesive (RA), cohesive (RC), superficial cohesive (RCS) and delaminating of the support (DEL). The coexistence of more than one type of breakage can be observed in the same pulling/tearing test. The ruptures with delamination of the support (DEL or DEL/RC) are desired.

The bi-constituent polyurethane adhesive used to illustrate the invention is an adhesive of the semi-flexible type, which is used at a rate of 100 parts by volume of resin (mixture of polyols) for 100 parts of hardener (mixture of isocyanates). The intimate mixture of the two constituents is obtained using a static mixer connected to a double cartridged spray gun, the assembly currently used for the application of these adhesives.

Different formulations were tested, which demonstrated the synergies between the different components of the composition according to the invention.

The following results were obtained by implementing a selection of preferred components alone or in the form of compositions according to the present invention as well as the action of a methyl-ethyl-ketone solution (MEK) according to the prior art.

The analogous effects observed on the SMC test pieces and GRP test pieces, non-sanded (or non-abraded) in both cases, with respect to the tested compositions are as follows:

|  | DMSO (%) | NMP (%) | BO (%) | | Effect |
|---|---|---|---|---|---|
|  |  |  |  | PY (%) |  |
| Formula 1 | 47.5 | 47.5 | — | 5.0 | RA/RCS |
| Formula 2 | 95.0 | — | — | 5.0 | RA/RCS |
| Formula 3 | 30.0 | — | — | 5.0 | RA/RCS |
| Formula 4 | 15.0 | 15.0 | 70.0 | — | RA/RCS |

-continued

| Formula 5 | 12.5 | 12.5 | 70.0 | — | RA/RCS |
| Formula 6 | 12.5 | 12.5 | 65.0 | 10.0 | DEL/RC |
| Formula 7 | 25.0 | 25.0 | 25.0 | 25.0 | DEL |
| Formula 8 | — | — | 100.0 | — | RA/RCS |
| Formula 9 | — | — | 80.0 | 20.0 | RA/RCS |
| Formula 10 | 25.0 | — | 70.0 | 5.0 | RC/RCS/DEL |
| Formula 11 | — | 25.0 | 70.0 | 5.0 | RC/RCS/DEL |
|  |  |  |  | IM (%) |  |
| Formula 12 | 12.5 | 12.5 | 65.0 | 5.0 | DEL/RC |

|  | MEK (%) | Effect |
|---|---|---|
| Control 1 | 100.0 | RA/RCS |
| Control 2 | — | RA | when a polar aprotic solvent or a mixture of polar aprotic solvents is used alone, no improvement with respect to the Controls 1 and 2 is observed.

when an ether or a mixture of ethers is used alone, no improvement with respect to Controls 1 and 2 is observed.

when a polar aprotic solvent or a mixture of polar aprotic solvents is used in combination with an ether or a mixture of ethers, no improvement with respect to Controls 1 and 2 is observed.

when a polar solvent or a mixture of polar solvents is used in combination with an activator or a mixture of activators, no improvement with respect to the Controls 1 and 2 is observed.

when ether or a mixture of ethers is used in combination with an activator or a mixture of activators, no improvement with respect to Controls 1 and 2 is observed.

when a polar aprotic solvent or a mixture of polar aprotic solvents, an ether or a mixture of ethers and an activator or a mixture of activators are associated in the voluminal proportions according to the invention, a clear improvement over Controls 1 and 2 is observed.

when the polar aprotic fraction of a composition according to the invention is composed of a 50/50 mixture of dimethylsulfoxide (DMSO) and dimethylformamide (DMF), a slight improvement with respect to the equivalent compositions using only DMSO or DMF is observed.

The particular compositions exhibiting the best efficacy and reduced flammability include those having a base of benzyl ether or benzyl oxide (BO) with a flash point greater than 100° C.

What is claimed:

1. A composition comprising:
   (a) at least one polar aprotic solvent (TPA)
   (b) an ether (TE), comprising an ether, an ether-ester, or an ether-ketone, or combination thereof having:
   a molar volume less than 200 cm$^3$/mole,
   a molecule devoid of a hydroxyl function
   (c) at least one activator (TA) comprising at least one reactive —NH$_2$ and/or —NH— nitrogenous function, of molar volume less than 100 cm$^3$/mole,
   wherein (a), (b), and (c) are present in proportions effective for cold preparation of laminated composite materials based on polyester resins to confer to them without preliminary sanding or abrasion a surface state suitable for adhesive bonding with a polyurethane adhesive.

2. The composition according to claim 1, wherein said TE molar volume is less than 160 cm$^3$/mole.

3. The composition according to claim 1, wherein the polar aprotic solvent (TPA) is dimethylsulfoxide (DMSO), dimethylformamide (DMF), 1-methyl-2-pyrrolidinone (NMP), N-methylmorpholine (NMm), γ-butyrolactone (Blo), acetonitrile (AcN), ethylene carbonate or propylene carbonate.

4. The composition according to claim 1, wherein the ether (TE) is 1,4-dioxane (Dx), methyl-tert-butyl-ether (MTBE), diethylether, tert-amyl-methylether (TAME), 2-methoxy-1,3-dioxolane, 1,3,5-trioxane, methyl methoxyacetate, methyl-3-methoxy-propionate (MMP), dipropyleneglycol dimethyl-ether (DPGDME), propyleneglycol methyl ether acetate (PGMA), tetrahydrofuran (THF), benzyl oxide (BO), dibenzyl ether (DBE), 1,3-dimethyoxybenzene, 1,4-dimethoxybenzene, 1,2,3-trimethoxybenzene, 2-methoxy-1,3-dioxolane, 1,3-dioxolane, anisole, 1,2-dimethoxybenzene, 2-methoxy-3,4-dihydropyran, 2,5-dimethoxytetrahydrofuran, ethyleneglycoldimethylether, 1-tert-butoxy-2-methoxy-ethane, 1,4-dioxane or 1,3-dioxane.

5. The composition according to claim 1, wherein the activator (TA) is pyrrole, imidazole, pyrazole, or 3-pyrroline.

6. The composition according to claim 1, wherein Total Polar Aprotic (TPA), Total Ether (TE) and Total Activator (TA) described by the coordinates:

$$TPA^* = [TPA/(TPA+TE+TA)] \cdot 10^2$$

$$TE^* = [TE/(TPA+TE+TA)] \cdot 10^2$$

$$TA^* = [TA/(TPA+TE+TA)] \cdot 10^2$$

are linked to a ternary diagram by the relations:

$$10\% < TPA^* < 40\%$$

$$55\% < TE^* < 85\%$$

$$1\% < TA^* < 25\%$$

where a looping relation is applied to 100% of the composition $TPA^* + TE^* + TA^* = 100$, all the amounts TPA, TE, TA are expressed by volume, the amounts TPA*, TE* and TA* appearing as volume percentages.

7. The composition according to claim 1, wherein the polar aprotic solvent (TPA) is a mixture of dimethylsulfoxide (DMSO) and dimethylformamide (DMF), wherein the ratio of volume of DMSO to volume of DMF ranges from about 40/60 to about 60/40.

8. The composition according to claim 7, wherein the ratio of volume of DMSO to volume of DMF is about 50/50.

9. The composition according to claim 1, wherein the ether (TE) is an ether having a flash point greater than 100° C.

10. The composition according to claim 9, wherein the ether (TE) is benzyl oxide (BO) or dibenzyl ether.

11. The composition according to claim 1, wherein the ether (TE) comprises one or more methoxy groups.

12. A laminate composite comprising:
(a) two or more polyester-based resin layers; each of said layers including at least one surface which is adhesively bound to a surface of another layer, wherein said surface is not sanded or abraded;
(b) a polyurethane adhesive between the surfaces of said layers which are adhesively bound.
wherein said surfaces of said layers which are adhesively bound are pre-treated with the composition according to claim 1 prior to application of the adhesive.

13. A process for preparation of the composition according to claim 1, comprising simple mixing of components (a)-(c).

14. A process for cold preparation of surfaces of materials for adhesive bonding, used to form a laminated composite, comprising treating the surfaces of said materials with the composition according to claim 1.

15. The process according to claim 14, wherein said composite materials are SMC (Sheet Molding Compounds), BMC (Bulk Molding Compounds), RTM (Resin Transfer Molding), AMC (Adapted Molding Compound), or RIM (Resin Injection Molding) materials.

16. The process according to claim 14, wherein said composite materials are laminated materials of the GRP (Glass Reinforced Plastic) or FRP (Fiber Reinforced Polymers) type based on a resin of unsaturated polyesters.

17. The process according to claim 14, comprising treating the surface to be adhesively bonded at a temperature ranging from about 5° C. to about 50° C.

18. The process according to claim 17, comprising treating the surface at a temperature ranging from about 15° C. to about 30° C.

19. The process according to claim 14, further comprising applying an adhesive less than 60 minutes after treating the surfaces of said materials with the composition according to the invention without previous drying of the treated surfaces.

20. The process according to claim 14, comprising treating the surfaces of said materials by immersion, spraying, or coating with a brush, a rag, or a sponge.

21. The process according to claim 14, comprising treating the surfaces of the materials before adhesive bonding or assembly with a polyurethane adhesive.

22. The process according to claim 21, wherein the polyurethane adhesive is of the mono-component (PU1K or HMPUR) or bi-component (PU2K) type.

* * * * *